US012563309B2

(12) United States Patent
Fassi et al.

(10) Patent No.: US 12,563,309 B2
(45) Date of Patent: Feb. 24, 2026

(54) MULTI-CAMERA THREE-DIMENSIONAL CAPTURING AND RECONSTRUCTION SYSTEM

(71) Applicant: POLITECNICO DI MILANO, Milan (IT)

(72) Inventors: Francesco Fassi, Seriate (IT); Luca Perfetti, Rho (IT); Stefano Parri, Legnano (IT)

(73) Assignee: POLITECNICO DI MILANO, Milan (IT)

( * ) Notice: Subject to any disclaimer, the term of this patent is extended or adjusted under 35 U.S.C. 154(b) by 186 days.

(21) Appl. No.: 18/272,566

(22) PCT Filed: Jan. 13, 2022

(86) PCT No.: PCT/IB2022/050253
§ 371 (c)(1),
(2) Date: Jul. 14, 2023

(87) PCT Pub. No.: WO2022/153207
PCT Pub. Date: Jul. 21, 2022

(65) Prior Publication Data
US 2024/0147083 A1 May 2, 2024

(30) Foreign Application Priority Data

Jan. 18, 2021 (IT) ........................ 102021000000812

(51) Int. Cl.
*H04N 23/90* (2023.01)
*G03B 37/04* (2021.01)
*H04N 23/698* (2023.01)

(52) U.S. Cl.
CPC ............. *H04N 23/90* (2023.01); *G03B 37/04* (2013.01); *H04N 23/698* (2023.01)

(58) Field of Classification Search
CPC ....... H04N 23/90; H04N 23/698; G03B 37/04
(Continued)

(56) References Cited

U.S. PATENT DOCUMENTS 8,811,812 B1 * 8/2014 Lawler ................ G03B 17/561
                                                    396/419
10,230,904 B2 * 3/2019 Cabral ................... H04N 23/90
(Continued)

FOREIGN PATENT DOCUMENTS

WO      2018076154 A1      5/2018

OTHER PUBLICATIONS

Mariana Campos et al : A Backpack-Mounted Monidirectional Camera with Off the Shelf Navigation Sensors for Mobile Terrestrial Mapping: Development and Forest Application; Mar. 9, 2018.
(Continued)

*Primary Examiner* — James T Boylan
(74) *Attorney, Agent, or Firm* — Dickinson Wright PLLC; Andrew D. Dorisio; Nicholas P. Coleman

(57) ABSTRACT

A multi-camera three-dimensional capturing and reconstruction system comprising: a mechanical structure (10); at least five cameras (11-15) are placed on said structure (10); characterised in that said at least five cameras (11-15) are cameras each using a fisheye optic; said at least five cameras (11-15) are configured so that, compared to a forward direction of said system: a first front camera (11) is directed with the options pointed at 0°±10°; a second front-right camera (12) is directed with the optics pointed at +45°±10°; a third front-left camera (13) is directed with the optics pointed at −45°±10°; a fourth rear-right camera (14) is directed with the optics pointed at 60°±20°; a fifth rear-left camera (15) is directed with the optics pointed at −60°±20°; x defines the distance between said second front-right camera (12) and said third front-left camera (13), the distance y
(Continued)

between said third front-left camera (13) and said fifth rear-left camera (15) is equal to or greater than the distance x, with y being greater than or equal to 10 cm.

12 Claims, 2 Drawing Sheets

(58) Field of Classification Search
  USPC .......................................................... 348/47
  See application file for complete search history.

(56)                    References Cited

U.S. PATENT DOCUMENTS

2010/0295945 A1* 11/2010 Plemons ................ H04N 23/51
                                                              348/148
2015/0348580 A1* 12/2015 van Hoff .............. H04N 13/271
                                                              348/48
2017/0280056 A1*  9/2017 Chapdelaine-Couture ..................
                                                              G06T 3/12
2017/0363949 A1* 12/2017 Valente ................ H04N 13/204
2020/0106960 A1    4/2020 Aguilar
2022/0303445 A1*  9/2022 Skaff ...................... H04N 23/57
2023/0179743 A1*  6/2023 Hoffmann .............. H04N 23/90
                                                              348/148

OTHER PUBLICATIONS

Shunping Ji, et al. Panoramic SLAM from a multiple fisheye camera rig; Elsevier; China; 2020.

* cited by examiner

MULTI-CAMERA THREE-DIMENSIONAL CAPTURING AND RECONSTRUCTION SYSTEM

TECHNICAL FIELD

The present invention refers to a multi-camera three-dimensional (3D) capturing and reconstruction system.

BACKGROUND

The 3D capturing and reconstruction systems have a practical problem common to many realities that operate in the architectural, archaeological, geological and infrastructural fields, namely, the unsustainability, in terms of time and costs, of the classic techniques in surveying environments such as: tunnels, narrow staircases, attics, underground utilities, catacombs, aqueducts etc. Namely, all those environments characterised by structural complexity, little or no lighting, possible danger in the event of long stays and above all by a tunnel shape, therefore environments that are very narrow in width and small in height but very long. The market offers few if any possibilities for surveying these environments; there is a real difficulty in finding instruments that are sufficiently agile to be moved in narrow, but also very long, environments and that are able to detect very close objects.

All the measurement techniques possible today, such as dynamic capture scanner systems, suffer from the problem of error propagation along the prevailing measurement direction, leading to even significant deviations that are difficult to predict or control and often cannot be corrected in post-processing.

For this reason, they are not considered reliable per se in metric terms, requiring support, correction and verification measurements, which are not always possible and are very difficult.

Classic measurement techniques require capturing time and time spent on site, which are often not physically or economically possible. The need to collect very redundant data (given the shape of the environments) also makes post-processing borderline feasible.

An aim of the present invention is to provide a multi-camera 3D capturing and reconstruction system that overcomes the drawbacks of the known art.

Another aim is to provide a multi-camera 3D capturing and reconstruction system that is designed, in particular, for small and narrow environments.

A further aim is to provide a system which is easy to handle.

SUMMARY

In accordance with the present invention, these aims, and others still, are achieved by a multi-camera three-dimensional capturing and reconstruction system comprising: a mechanical structure; at least five cameras are placed on said structure; characterised in that said at least five cameras are cameras each using a fisheye optic; said at least five cameras are configured so that, compared to a forward direction of said system: a first front camera is directed with the optics pointed at 0°±10°; a second front-right camera is directed with the optics pointed at +45°±10°; a third front-left camera is directed with the optics pointed at −45°±10°; a fourth rear-right camera is directed with the optics pointed at 60°±20°; a fifth rear-left camera is directed with the optics pointed at −60°±20°; x defines the distance between said second front-right camera and said third front-left camera, the distance y between said third front-left camera and said fifth rear-left camera is equal to or greater than the distance x, with y being greater than or equal to 10 cm.

Further characteristics of the invention are described in the dependent claims.

The advantages of this solution compared to solutions of the known art are various.

The system allows three-dimensional reconstruction and photographic inspection of both artificial and natural confined spaces in order to tackle the problem of survey accuracy and repeatability.

It finds its natural application in situations where a 360-degree digitisation is required, comprising high-resolution 3D geometric information and complete photographic documentation, which is increasingly common and required in the field of digital information and which opens up possibilities for exploitation in the field of modelling (Building Information Modeling—BIM), virtual reality (VR) and augmented reality (AR) experiences and "data sharing online".

The system is designed to be held and used by a single operator independently by walking through the environment/tunnel to be surveyed at the normal walking speed and allowing a complete and fully automatic capture in very short times. Alternatively, the system can be mounted on a cart.

Using the principle of image matching, the rules of digital photogrammetry, exploiting structure-from-motion algorithms and a multi-camera system specifically designed for the type of reference application, the device is intended to be an alternative to modern dynamic 3D surveying systems on the market, offering high accuracy shape measurement combined with capturing images with superior quality, which are optimal characteristics for digitisation and detailed inspection of the surfaces.

The device makes it possible to limit the propagation of drift error during long captures. This is due to the combined exploitation of an angle of view of the fisheye optics, at least five cameras arranged in such a way that the entire scene except for the operator is shot in its entirety at all times, the accurate synchronisation of the capturing of the photographic shots, the accurate calibration of the fixed distances between the cameras, and the processing of the data by means of the Structure From Motion process. All this allows the identification of a large number of key points in each direction around the structure and of a large number of constraints between the images (homologous points) between the cameras forming part of the structure and between consecutive positions of the structure itself during movement. The wide angle of view means that the same key points can be recognised and used as constraints (homologous points) in a large number of consecutive positions of the structure before they no longer fall within the field of view of the cameras. The redundancy of these constraints reduces the drift error in long captures.

The device makes it possible to reduce the number of images required for 360° 3D reconstruction thanks to the wide angle of view of the fisheye optics, which allow complete coverage of the framed scene, except for the operator, to be obtained by using only five cameras. Furthermore, the wide angle of view of the structure makes it possible to obtain a great redundancy of constraints (homologous points to connect subsequent positions of the structure) while allowing a large ratio between the shooting base and shooting distance (bp/dp), namely, the ratio between the distance of the barycentres of two consecutive positions of the structure and the distance between the barycentre of the structure and the photographed surface, equal to 1:1, whereas instead, by using straight projection optics, this ratio must be lower (approximately 1:2) significantly increasing the number of images required.

The device makes it possible to obtain a reconstruction directly to scale without the need for additional support measurements by exploiting the fixed relative position of the calibrated cameras and the synchronisation of the cameras.

It also makes capture fast and achievable even for non-expert photogrammeters; this is also possible in a completely autonomous manner by mounting the structure on a vehicle or other mode of movement.

The device makes use of global shutter type cameras and uses fisheye lenses.

The fisheye optics with an angle of view of 190° (greater than) 150°, arranged at different angles and directed towards the outside of the barycentre of the structure, allow a hemispherical shot of the framed scene, excluding the operator, allowing omnidirectional constraint points that make, at the same time, the final reconstruction and the determination of the device at the moment of capture more robust; furthermore, the reduced focal length favours a wide depth of field that allows very close and far objects to be in focus simultaneously, improving the result of the subsequent image processing.

The relative arrangement between the cameras and in particular the presence of a significant distance between the shooting centres of the cameras, in particular along the direction of pointing of the instrument, as well as the walking direction, allows the accurate triangulation of homologous points and the scaling of the resulting three-dimensional reconstruction.

The constrained, fixed and calibrated position between the cameras allows automatic and accurate dimensioning, even in the case of very large environments.

The device is also transportable and lightweight, therefore it can be used in extreme conditions.

The instrument can be scaled up in size by moving the cameras closer and further apart to better adapt it to more or less spacious environments, and in the number of cameras, which can be added in any number if necessary.

The instrument works autonomously and for a long time, so it can therefore be easily mounted on a mobile support for even very long captures and used even by non-expert photogrammeters.

It is possible to integrate with other sensors useful to further improve the accuracy and/or to expand the type of data acquired, such as, for example, thermal cameras.

It is also possible to process or pre-process the data in real time.

BRIEF DESCRIPTION OF THE DRAWINGS

The characteristics and advantages of the present invention will be clear from the following detailed description of a practical embodiment thereof, illustrated by way of non-limiting example in the accompanying drawings, wherein.

DETAILED DESCRIPTION

Figure 1:
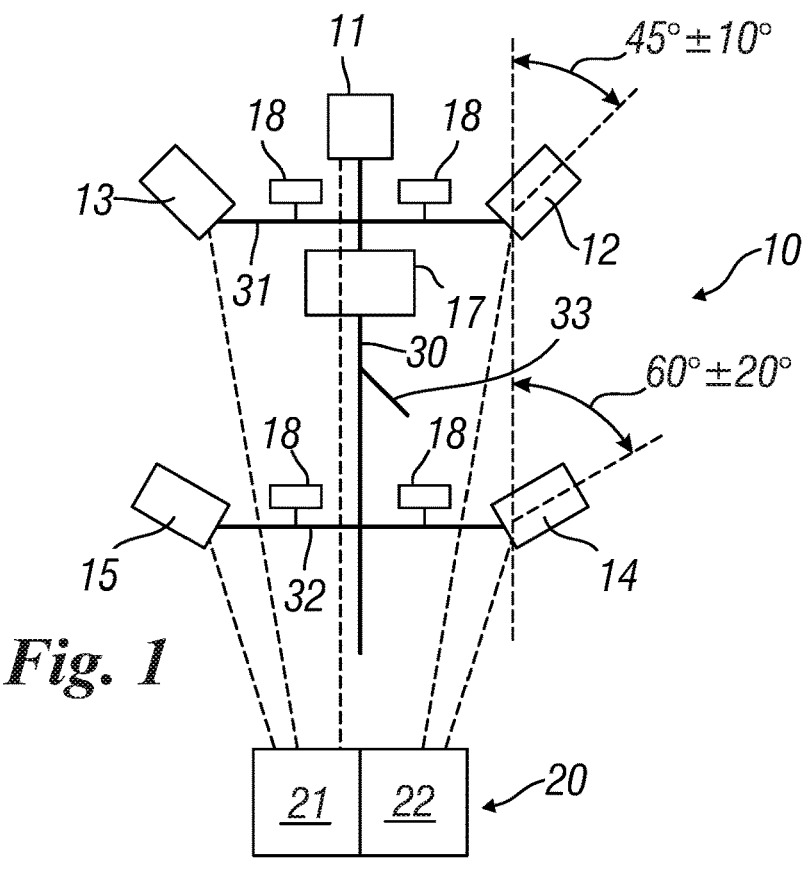
FIG. 1 shows a multi-camera 3D capturing and reconstruction system, viewed from above, in accordance with the present invention.
Figure 2:
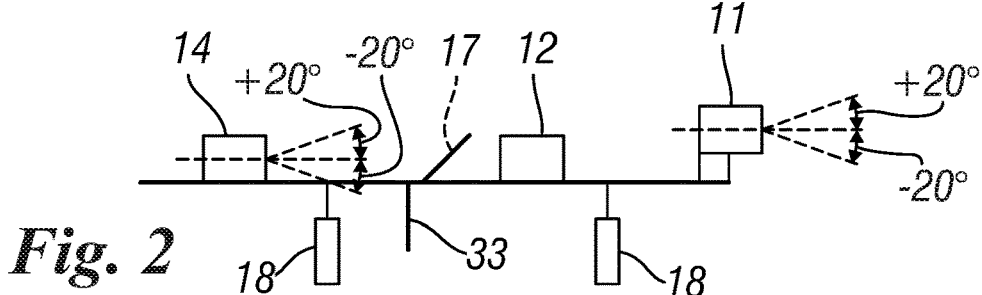
FIG. 2 shows a multi-camera 3D capturing and reconstruction system, viewed from the side, in accordance with the present invention.
Figure 3:
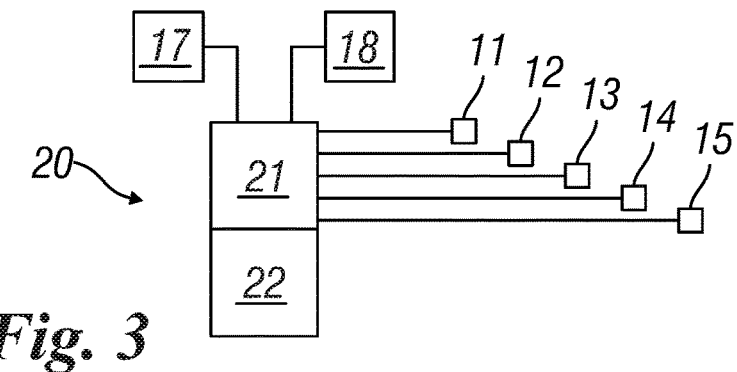
FIG. 3 shows a block diagram of a control centre of a multi-camera 3D capturing and reconstruction system, in accordance with the present invention.
Figure 4:
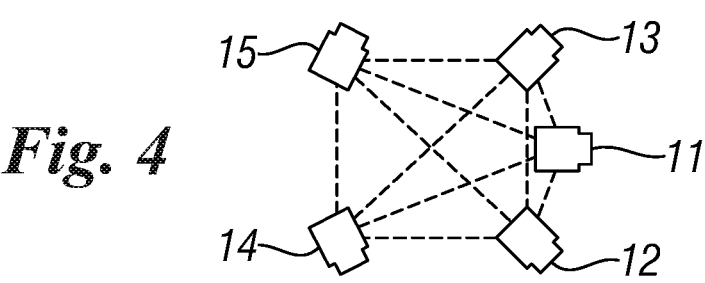
FIG. 4 schematically shows a first arrangement of the cameras of a multi-camera 3D capturing and reconstruction system, in accordance with the present invention.
Figure 5:
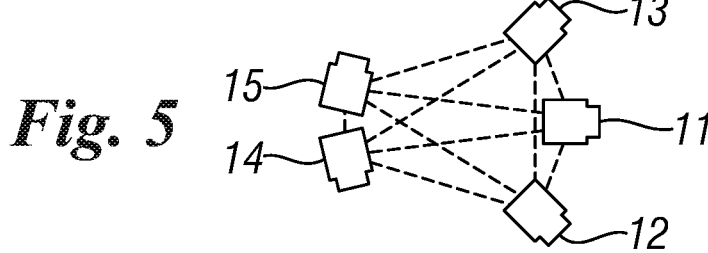
FIG. 5 schematically shows a second arrangement of the cameras of a multi-camera 3D capturing and reconstruction system, in accordance with the present invention.
Figure 6:
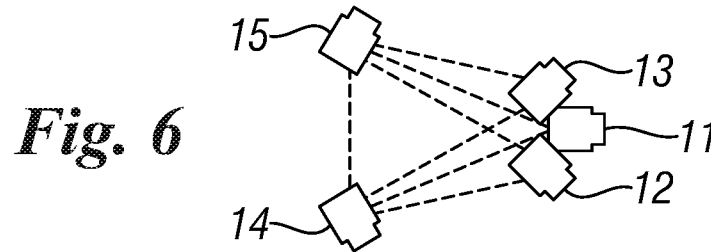
FIG. 6 schematically shows a third arrangement of the cameras of a multi-camera 3D capturing and reconstruction system, in accordance with the present invention.
Figure 7:
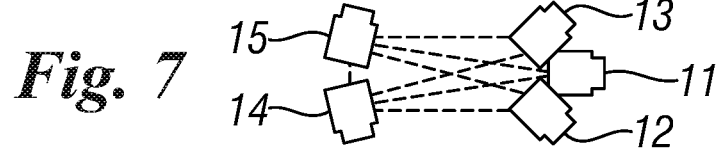
FIG. 7 schematically shows a fourth arrangement of the cameras of a multi-camera 3D capturing and reconstruction system, in accordance with the present invention.
Figure 8:
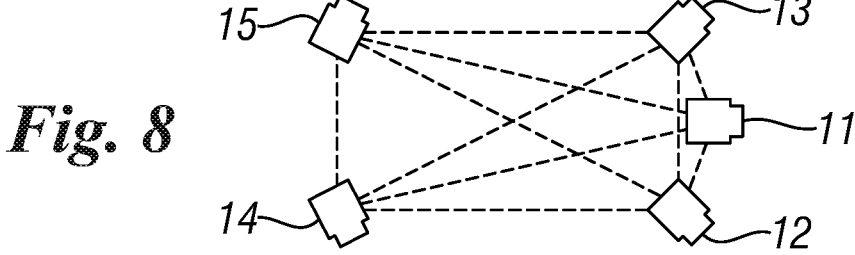
FIG. 8 schematically shows a fifth camera arrangement of a multi-camera 3D capturing and reconstruction system, in accordance with the present invention.

With reference to the attached figures, a multi-camera 3D capturing and reconstruction system, in accordance with the present invention, comprises a mechanical structure 10 on which at least five cameras 11-15 are placed. On the structure 10 there is also preferably a screen 17 (replaceable with a tablet or smartphone) and preferably at least one LED lighting lamp 18. The screen and the lamp may also be placed on other structures.

Other sensors such as inertial sensors or thermal cameras (not shown) can also be installed on the structure 10.

The cameras 10-15, the screen 17, the lamps 18 and other sensors are electrically connected to a transportable control centre 20 comprising a computer 21 for management of the system, for image capturing and storage and possibly first processing of the captured images, and a power-supply battery 22.

The structure 10, in one embodiment thereof, basically consists of a rod 30 with a first camera 11 placed at its front end. A first crossbar 31, perpendicular to the rod 30, is placed in proximity of the front end of the rod 30. The front cameras 12 and 13 are placed at the ends of the first crossbar 31.

A second crossbar 32, perpendicular to the rod 30, is placed at the rear of the first crossbar 31. The rear cameras 14 and 15 are placed at the ends of the second crossbar 32.

A vertical handle 33 which allows the operator to carry the system is placed, in a barycentric position, underneath the rod 30.

In an alternative embodiment, the structure 10 comprises a metal plate shaped as a rigid fastening between all the cameras, therefore without rod and crossbars.

With respect to a horizontal axis, having the angle of 0° positioned frontally, namely, in the forward direction of the cameras 11-15, the first front camera 11 is directed with the optics pointed at 0°, the second front-right camera 12 is directed with the optics pointed at +45°, the third front-left camera 13 is directed with the optics pointed at)−45° (315°, the fourth rear-right camera 14 is directed with the optics pointed at 60°, the fifth rear-left camera 15 is directed with the optics pointed at)−60° (300°.

The above angles, in which the cameras 11-13 are directed, can be varied by approximately ±10° by shifting on a horizontal plane (right/left) and being positioned along a vertical plane at 0°, namely, in a horizontal position, this angle can vary by approximately ±20° (up/down).

The above angles, in which the cameras 14-15 are positioned, can be varied during fastening on the structure by approximately ±20°, both along the horizontal plane (right/left) and along the vertical plane (up/down).

The front cameras 12 and 13 and the rear cameras 14 and 15 are aligned with each other and are located, substantially, at the vertices of a square or a rectangle.

The front camera 11 is slightly more forward compared to the front cameras 12 and 13 to avoid interference with them.

The cameras 11-15 all lie substantially on a same horizontal plane.

Preferably, the front camera 11 is raised a few centimetres to avoid framing interference with the cameras 12 and 13.

A preferred arrangement of the cameras is that with the cameras 12-15 arranged on the vertices of a square, with the front camera 11 arranged centrally and frontally.

Another arrangement provides the rear cameras 14 and 15 closer to each other at a distance less than the distance between the front cameras 12 and 13.

In this description, distance between the cameras means the distance between the sensor centres of the cameras themselves.

A further arrangement provides the front cameras 12 and 13 closer to each other at a distance less than the distance between the rear cameras 14 and 15.

A further arrangement provides the front cameras 12 and 13, and the rear cameras 14 and 15 closer to each other and arranged on the vertices of a rectangle.

A further arrangement provides the front cameras 12 and 13, and the rear cameras 14 and 15 spaced apart and arranged on the vertices of a rectangle.

The distance between the cameras can be defined so that if x is the distance between the cameras 12 and 13 (or between 14 and 15), the distance y between the cameras 13-15 (or between 12 and 14) is equal to or greater than the distance x, where y is greater than or equal to 10 cm, therefore the cameras 12-15 will be arranged either on a square or on a rectangle elongated in the direction of movement of the device.

The front camera 11 is always arranged centrally and, namely, at a distance x/2 from the camera 12 and the camera 13.

The front camera 11 may be aligned with the cameras 12 and 13 or may be in a more forward position compared to them in order to avoid interference.

It is also possible to determine the distance y between the cameras 12 and 14 or between the cameras 13 and 15 based on the width z of the reference environment (typically a tunnel), and preferably the distance y will be equal to z/4±10%.

This geometry is then effective for tunnel widths from z/2 to 4z.

Therefore, for tunnel widths between 0.4 m and 8 m, the distance y is normally comprised between 10 cm and 200 cm.

For each camera 11-15, a ⅔" colour camera with a resolution of 2448×2048 pixels at a detector pitch of 3.45 μm was used.

Cameras with different features in terms of resolution and radiometric capabilities can also be used.

The cameras use fisheye optics required to have sufficient coverage between images in the single capture, a robust overlap between successive shots covering a large portion of the tunnel even at a close view, and to have a very broad depth of field allowing the lenses to lock focus. Fisheye optics with equidistant projection, a field of view of 190°, with an image circle of 7.2 mm, and in any case with a minimum field of view of 150° were used.

The camera orientation angles are a function of the coverage of the fisheye optics used and the fisheye projection employed.

A sensor of the global shutter type cameras was also used and therefore an image capturing method was used where all the pixels that make up an image are captured at the same time.

Similarly, the geometric configuration of the cameras is periodically calibrated, by fastening the cameras in their position, with an accuracy of approximately 0.1 mm to ensure accurate scaling of the 3D reconstruction.

The cameras must also be synchronised, this takes place through the use of a hardware connection between the cameras of the device. An accurate synchronisation is important to avoid the introduction of distortions due to the presence of relative movement between the cameras and the framed scene. A synchronisation cable connects the master camera 11 to the slave cameras 12-15, the connection ensures that the capturing signal towards the master camera also causes capturing for the slave cameras.

The simultaneous presence of a synchronisation error and of a relative shift between the camera system and the framed scene, causes a deformation of the geometric ratios between the cameras (the calibrated distances) in a variable way as a function of: the type of the synchronisation error, the type of shift and its direction and the distance between the cameras and the surface shot. The presence of this deformation prevents the imposition of the calibrated distances as a fixed constraint during processing, given that the actual position of the cameras at the moment of the shot varies as a function of movement (if one camera shoots even slightly later than another, the distance between the position of the two at the moment of the respective shots increases as the speed of the shift increases); while imposing the calibrated distances as a constraint would shift the deformation in the three-dimensional reconstruction.

The synchronisation problem was approached from the point of view of the cameras. Considering in fact the cameras as stationary and the framed scene in movement. In the presence of a synchronisation error the point P of the scene will be shot at the time t0 by camera 1 and at time t1 by the camera 2. The point P at position t1 is projected on the sensor of camera 2 in a different position from the one to which it would have been projected at time t0. The distance between these two points is z and if z is less by two pixels of the sensor of the camera 2, the distortion produces no effect. The synchronisation problem was tackled by defining a maximum threshold for the shift error of a given point of the object in the image space due to the synchronisation error and the presence of relative movement between the object and the camera, equal to 2 pixels.

With a regular slow walking speed of approximately 1 m/s and a distance of the object to be detected of 50 cm, the estimated maximum acceptable synchronisation error is approximately 1 ms to satisfy the condition according to which this shift error is less by the size of two pixels.

The synchronisation error measured in one embodiment of the device was 200 us, which allows distortion-free capturing of a surface at the distance of 50 cm up to a maximum movement speed of 5 m/s, which is equivalent to 18 km/h.

The images captured by the cameras are stored on the on-board computer 21. The data processing step to obtain a reconstruction in scale, following a photogrammetric pipeline (structure from motion), in which the known calibrated distances between the cameras are provided as a constraint, takes place in post-production (off-line) but a low-resolution three-dimensional reconstruction can also be performed on board with the computer 21, in order to verify the results previewed on the screen 17.

The instrument is carried by hand by an operator who can set the shooting parameters from the screen 17 and control the shooting of images during the survey.

Images can be shot in different modes such as single shot, timed sequence shot or video. Once the capturing has started, the operator simply walks around the scene framing the object.

The invention claimed is:

1. A multi-camera three-dimensional capturing and reconstruction system comprising:

a mechanical structure (1 0);

at least five cameras (11-15) are placed on said structure (1 0);

characterised in that said at least five cameras (11-15) are cameras each using a fisheye optic;

said at least five cameras (11-15) are configured so that, compared to a forward direction of said system:

a first front camera (11) is directed with the optics pointed at 0°±10°;

a second front-right camera (12) is directed with the optics pointed at +45°±10°;

a third front-left camera (13) is directed with the optics pointed at −45°±10°;

a fourth rear-right camera (14) is directed with the optics pointed at 60°±20°;

a fifth rear-left camera (15) is directed with the optics pointed at −60°±20°;

wherein x defines the distance between said second front-right camera (12) and said third front-left camera (13), the distance y between said third front-left camera (13) and said fifth rear-left camera (15) is equal to or greater than the distance x, with x being greater than or equal to 10 cm;

wherein the mechanical structure comprises a rod, a first crossbar perpendicular to the rod, and a second crossbar perpendicular to the rod;

wherein the first front camera is at a front end of the rod, wherein the second front-right camera and the third front-left camera are placed on the first crossbar on opposing sides of the rod, and wherein the fourth rear-right camera and the fifth rear-left camera are placed on the second crossbar on opposing sides of the rod.

2. The system according to claim 1, characterised in that said at least five cameras (11-15) are configured so that, compared to a vertical plane passing through each of said at least five cameras (11-15), they are placed at an angle of 0°±20°.

3. The system according to claim 1, characterised in that said second camera (12), said third camera (13), said fourth camera (14) and said fifth camera (15) lie substantially on the vertices of a square.

4. The system according to claim 3, characterised in that the distance y between said second camera (12) and said fourth camera (14), and the distance y between said third camera (13) and said fifth camera (15) is comprised between 10 and 200 cm.

5. The system according to claim 1, characterised in that said second camera (12), said third camera (13), said fourth camera (14) and said fifth camera (15) lie substantially on the vertices of a rectangle.

6. The system according to claim 1, characterised in that said first camera (11), said second camera (12), said third camera (13), said fourth camera (14) and said fifth camera (15) lie in substantially a same horizontal plane.

7. The system according to claim 1, characterised in that said first camera (11) is raised compared to said second camera (12), said third camera (13), said fourth camera (14) and said fifth camera (15).

8. The system according to claim 1, characterised in that said at least five cameras (11-15) use an image capturing method of the global shutter type.

9. The system according to claim 1, characterised in that said first camera (11) is in a more forward position compared to said second camera (12) and to said third camera (13).

10. The system according to claim 1, characterised in that said system further comprises a transportable control centre (20) comprising a power-supply battery (22) and a computer (21).

11. The system according to claim 1, characterised in that said system is transportable.

12. The system according to claim 1, wherein said second camera (12), said third camera (13), said fourth camera (14) and said fifth camera (15) lie substantially on the vertices of a rectangle in a horizontal plane, and wherein said first camera (11) is raised above said horizontal plane.

\* \* \* \* \*